United States Patent Office 3,285,952
Patented Nov. 15, 1966

3,285,952
OXIDATION OF 2,5-DIARYLAMINO-DIHYDRO-
TEREPHTHALATES WITH NITROBENZENE
Chi K. Dien, Buffalo, N.Y., assignor to Allied Chemical
Corporation, a corporation of New York
No Drawing. Filed Nov. 20, 1962, Ser. No. 239,075
10 Claims. (Cl. 260—471)

This invention relates to a novel process for the oxidation of 2,5-diarylamino-dihydroterephthalate esters. More particularly it relates to the oxidation of 2,5-diarylamino-dihydroterephthalates with nitrobenzene.

Esters of 2,5-diarylamino-dihydroterephthalic acids are known in the art. They can be prepared by the condensation of dialkyl-succinyl succinates with an aryl amine, such as aniline, toluidine, α-naphthylamine and the like. The esters are valuable intermediates for the quinacridone series of pigments, which by virtue of their intense shades and extreme fastness characteristics are much in demand.

The oxidation of the esters of 2,5-diarylamino-dihydroterephthalate according to Lieberman, Annalen, 404, 295–308 (1914) by means of inorganic reagents, e.g., ferric chloride, gives poor yields of the desired product. The purity of the oxidized product, also, especially when it is to be used as an intermediate for the preparation of a quinacridone pigment, leaves much to be desired. It is therefore an object of this invention to devise a novel process for the oxidation of esters of 2,5-diarylamino-dihydroterephthalic acids.

Another object is to devise a process for the oxidation of esters of 2,5-diarylamino-dihydroterephthalic acids which is productive of high yields of products suitable for use in the manufacture of quinacridone pigments.

Other objects and advantages ancilliary thereto will be obvious from the following description of my invention.

The novel process of my invention comprises the steps of heating an ester of a 2,5-diarylamino-dihydroterephthalic acid with nitrobenzene and thereafter separating the corresponding 2,5-diarylaminoterephthalic acid derivative from the reaction mixture.

The oxidized product is obtained in excellent yield and quality. It is eminently suitable for use in the manufacture of quinacridone pigments by subjecting it to the conventional steps of (1) Hydrolyzing the ester,
(2) Ring closing the acid, and
(3) Conditioning the ring-closed derivative.

In accordance with a preferred mode of carrying out the process of this invention, an ester of 2,5-diarylaminodihydroterephthalic acid, e.g., diethyl-2,5-dianilino-dihydroterephthalate, is heated at a temperature of about 210° to 215° C. in admixture with about 20 to 30 molecular equivalents of nitrobenzene for about 3 to 4 hours. Air is excluded by passing a current of inert gas, e.g., nitrogen, over or through the reaction mass. Thereafter the mass is cooled and diluted with alcohol. The resultant precipitate of diethyl-2,5-dianilinoterephthalate is recovered by filtration and is washed with alcohol to remove traces of mother liquor.

The oxidation reaction can also be carried out in the presence of an aqueous alkaline material such as aqueous caustic soda, aqueous caustic potash, thereby to accomplish simultaneously the oxidation of the dihydro body and hydrolysis of the ester. In this instance it is preferred that the ester, nitrobenzene and alkaline hydrolysis agent be dissolved or suspended in a solvent such as methyl or ethyl alcohol.

The novel process is applicable to the oxidation of any ester, but preferably the lower hydrocarbon alkane diesters of 2,5-diarylaminodihydroterephthalic acid. The arylamino groups can be derived from a wide variety of arylamines such as for example o, m or p-toluidine
o, m or p-fluoroaniline
o, m or p-chloroaniline
o, m or p-bromoaniline
o, m or p-iodoaniline
o, m or p-anisidine
o, m or p-phenetidine
o, m or p-isoamoxyaniline
o, m or p-trifluoromethylaniline
α or β-naphthylamine
2 or 4 biphenylamine The quantity of nitrobenzene used in the oxidation is not critical. Preferably, at least one mole should be used per mole of dihydroterephthalate ester being oxidized. An excess of nitrobenzene sufficient to provide a fluid reaction mixture is desirably used. I prefer to use from 2 to about 40 moles, particularly 3 to 20 moles, of nitrobenzene per mol of dihydroterephthalate ester. Substantially larger proportions of nitrobenzene are uneconomical.

The oxidation reaction is carried out at temperatures sufficiently above ambient in order to obtain a practical reaction rate. Preferably a temperature of between 60° C. and the boiling point of the reaction mixture is used. I especially prefer to carry out the reaction at between about 190° and 220° C., at atmospheric pressure. Higher temperatures can be obtained by carrying out the oxidation under pressure but this is not generally necessary and detracts from the economy of the reaction.

When the oxidation step is effected simultaneously with the hydrolysis of the ester, it is preferred that this be done in the presence of a solvent, preferably an aliphatic alcohol, e.g., methanol, ethanol, propanol, butanol and hexanol. As is well known the saponification of carboxylic acid esters proceeds best under the influence of strong alkaline reagents such as caustic soda, caustic potash and the like. The reaction is also favored by elevated temperature and extended time. Thus it is preferred to effect the saponification of the 2,5-diarylamino-dihydroterephthalic acid esters in the presence of a caustic alkali, at the boiling point of the mixture and for a period of at least 30 minutes.

The more detailed practice of my invention will be illustrated by the following examples. The parts and percentages are by weight and the temperatures are given in degrees centigrade.

EXAMPLE 1

A mixture of 16.3 parts of diethyl-2,5-dianilino-dihydroterephthalate and 144 parts of nitrobenzene was heated to 210° to 215° in an atmosphere of nitrogen. The mixture was maintained at about 210°±2° under a reflux condenser for 4 hours. The mass was cooled to ambient temperature and thereafter the red crystals which separated were filtered. The mother liquor was diluted with about 160 parts of ethanol to precipitate a second crop of red crystals which was combined with the first precipitate. The crystals were washed with ethanol and dried in a warm (60° C.) oven. The dried product, diethyl-2,5-dianilinoterephthalate weighing 13.9 parts (85.8% yield), melted at 145° to 150° C.

EXAMPLE 2

A mixture of 15 parts of diethyl-2,5-bis(p-methoxyphenylamino)dihydroterephthalate and 144 parts of nitrobenzene were heated to boiling in an atmosphere of nitrogen. The mixture was boiled for 4 hours under reflux and then after cooling to below 80°, diluted with about 160 parts of ethanol. The resultant precipitate was separated by filtration, washed with cold ethanol and dried. The dried product diethyl-2,5-bis(p-methoxyphenylamino) terephthalate weighed 14 parts.

EXAMPLE 3

In an analogous manner to that described in Example 2 above 20 parts of dimethyl-2,5-dianilinodihydroterephthalate were oxidized with 168 parts of nitrobenzene. In this manner 18 parts of dimethyl-2,5-dianilinoterephthalate melting at 155° to 162° C. were obtained.

EXAMPLE 4

By a procedure similar to that described in Example 2 above, 14 parts of diethyl-2,5 - di - o - toluidinodihydroterephthalate were oxidized with 132 parts of nitrobenzene to 11.8 parts of diethyl-2,5-di-o-toluidinoterephthalate.

EXAMPLE 5

In a similar fashion to that described in Example 2 above 15 parts of diethyl-2,5-di-$\alpha$-naphthylaminodihydrophthalate were oxidized with 144 parts of nitrobenzene to 14 parts of diethyl-2,5-di-$\alpha$-naphthylaminoterephthalate.

EXAMPLE 6

A mixture of 190 parts of diethyl-2,5-dianilinodihydroterephthalate and 960 parts of nitrobenzene was heated to and maintained at 200° to 210° for four hours. The mixture was cooled to below 100° and to it were added about 625 parts of ethanol. The resultant slurry was cooled to 15° and filtered. The filter cake of diethyl-2,5-dianilinoterephthalate was washed with cold alcohol and dried.

The mother liquor and wash obtained above was combined and distilled with steam until the distillate was free of nitrobenzene. To the distilland were added about 150 parts of 50% aqueous sodium hydroxide and the mixture was refluxed for about ½ hour. The mass was washed with about 140 parts of benzene and then the aqueous mass was acidified with dilute hydrochloric acid. The resultant slurry was filtered and the filter cake of 2,5-dianilinoterephthalic acid was washed acid-free with water.

EXAMPLE 7

A mixture of 20 parts of diethyl-2,5-dianilinodihydroterephthalate, about 65 parts of ethanol and 12 parts of nitrobenzene was heated to boiling under reflux. To this boiling mass, 12 parts of 50% aqueous sodium hydroxide were added dropwise and the resultant mass was refluxed for about 20 minutes thereafter. Following the addition of 50 parts of water, the reaction mass was steam-distilled to remove solvent and excess nitrobenzene, which required about 1 hour. The distilland was diluted with 500 parts of water and sludge filtered. The clarified filtrate was acidified. The precipitate of 2,5-dianilinoterephthalic acid was separated by filtration, washed with water and dried. The dried product, weighing 16.7 parts, was 99.7% pure on the basis of spectral comparison with an authentic sample of 2,5-dianilinoterephthalic acid.

From the above examples, it can readily be seen that an economical and effective process for the oxidation of esters of 2,5-diarylaminodihydroterephthalates has been devised. This novel procedure, which is productive of excellent yields of high quality esters of 2,5-diarylaminoterephthalates represents a valuable improvement in the known method of synthesis of quinacridone pigments.

As has been illustrated also, this novel process when carried out in the presence of strong alkalis makes possible the simultaneous hydrolysis and oxidation reactions, and thereby further increases the economic value of the present invention.

Since the above examples are intended to serve in an illustrative manner only, changes in the details set out therein can be made, as will be obvious to those skilled in this art, without departing from the scope or spirit of my invention.

I claim:
1. A process for the oxidation of esters of 2,5-diarylamino-dihydro-terephthalic acids which comprises heating an ester of 2,5-diarylamino-dihydro-terephthalic acid with nitrobenzene.
2. A process as claimed in claim 1 in which the amount of nitrobenzene used is from about 2 to about 40 molecular equivalents, per mole of the ester.
3. A process as claimed in claim 1 in which the amount of nitrobenzene used is from about 3 to about 20 molecular equivalents, per mole of the ester, while excluding air by means of an inert gas.
4. A process as claimed in claim 2 in which the reaction is carried out at a temperature within the range of 60° C. and 220° C.
5. A process as claimed in claim 3 in which the reaction is carried out at a temperature within the range of 190° C. to 220° C.
6. A process for the oxidation of esters of 2,5-diarylamino-dihydro-terephthalic acids which comprises heating a reaction mixture comprising essentially an ester of a 2,5-diarylamino-dihydro-terephthalic acid and about 3 to about 30 molecular equivalents of nitrobenzene under refluxing conditions at atmospheric pressure and at a temperature of at least 190° C.
7. A process for the oxidation of a lower hydrocarbon alkane diester of 2,5-diarylamino-dihydro-terephthalic acid which comprises heating a reaction mixture consisting essentially of the ester and about 3 to about 20 molecular equivalents of nitrobenzene under refluxing conditions at atmospheric pressure and at a temperature within the range of 190° C. to 220° C.
8. A process as claimed in claim 7 in which an inert gas is passed over the reaction mixture during the heating under refluxing conditions.
9. A process as claimed in claim 7 in which an inert gas is passed through the reaction mixture during the heating under refluxing conditions.
10. A process for the oxidation of a lower hydrocarbon alkane diester of 2,5-diarylamino-dihydro-terephthalic acid which comprises heating the ester with at least one molecular equivalent of nitrobenzene at a temperature within the range of 190° C. to 220° C. while excluding air by means of nitrogen.

References Cited by the Examiner
UNITED STATES PATENTS
3,045,040   7/1962   Deuschel _____ 260—471

LORRAINE A. WEINBERGER, *Primary Examiner.*

D. D. HORWITZ, L. A. THAXTON, *Assistant Examiners.*